(12) United States Patent
Nakamura et al.

(10) Patent No.: US 10,622,008 B2
(45) Date of Patent: Apr. 14, 2020

(54) AUDIO PROCESSING APPARATUS AND AUDIO PROCESSING METHOD

(71) Applicant: HONDA MOTOR CO., LTD., Tokyo (JP)

(72) Inventors: Keisuke Nakamura, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/193,481

(22) Filed: Jun. 27, 2016

(65) Prior Publication Data

US 2017/0040030 A1 Feb. 9, 2017

(30) Foreign Application Priority Data

Aug. 4, 2015 (JP) ................................. 2015-154215

(51) Int. Cl.
*G10L 25/78* (2013.01)
*G10L 25/27* (2013.01)
(Continued)

(52) U.S. Cl.
CPC ............ *G10L 25/78* (2013.01); *G01S 3/8006* (2013.01); *G10L 21/028* (2013.01); *G10L 25/27* (2013.01)

(58) Field of Classification Search
CPC ... G10L 21/0208; G10L 15/265; G10L 15/20; G10L 15/063; G10L 25/93; G10L 25/78;
(Continued)

(56) References Cited

U.S. PATENT DOCUMENTS 5,572,624 A * 11/1996 Sejnoha ............... G06K 9/6234
704/251
7,016,836 B1 * 3/2006 Yoda ....................... G10L 15/20
455/563
(Continued)

FOREIGN PATENT DOCUMENTS

JP 2005-202932 A 7/2005
JP 2005-227512 8/2005
(Continued)

OTHER PUBLICATIONS

Japanese Office Action with English translation dated Oct. 23, 2018, 4 pages.

*Primary Examiner* — Angela A Armstrong
(74) *Attorney, Agent, or Firm* — Rankin, Hill & Clark LLP

(57) ABSTRACT

An audio processing apparatus includes a first-section detection unit configured to detect a first section that is a section in which the power of a spatial spectrum in a sound source direction is higher than a predetermined amount of power on the basis of an audio signal of a plurality of channels, a speech state determination unit configured to determine a speech state on the basis of an audio signal within the first section, a likelihood calculation unit configured to calculate a first likelihood that a type of sound source according to an audio signal within the first section is voice and a second likelihood that the type of sound source is non-voice, and a second-section detection unit configured to determine whether or not a second section in which power is higher than average the power of a speech section is a voice section on the basis of the first likelihood and the second likelihood within the second section.

5 Claims, 7 Drawing Sheets

(51) Int. Cl.
*G10L 21/028* (2013.01)
*G01S 3/80* (2006.01)

(58) Field of Classification Search
CPC ....... G10L 21/028; G10L 25/27; G10L 25/21; H05K 999/99; H04W 88/02; H04W 64/00; H04M 1/72522; H04R 25/552; G01S 3/8006
See application file for complete search history.

(56) References Cited

U.S. PATENT DOCUMENTS

| | | | | |
|---|---|---|---|---|
| 7,653,537 B2* | 1/2010 | Padhi | | G10L 25/78 704/211 |
| 8,370,140 B2* | 2/2013 | Vitte | | H04R 3/005 379/388.06 |
| 8,682,658 B2* | 3/2014 | Vitte | | G10L 21/0208 704/203 |
| 9,224,392 B2* | 12/2015 | Hirohata | | G10L 15/20 |
| 9,330,683 B2* | 5/2016 | Suzuki | | G10L 25/84 |
| 9,478,232 B2* | 10/2016 | Hirohata | | G10L 21/0272 |
| 9,818,433 B2* | 11/2017 | Muesch | | G10L 25/78 |
| 2002/0049568 A1* | 4/2002 | Erdogan | | G06K 9/6234 702/189 |
| 2002/0147585 A1* | 10/2002 | Poulsen | | G10L 19/0212 704/233 |
| 2004/0042626 A1* | 3/2004 | Balan | | G10L 25/78 381/110 |
| 2004/0165730 A1* | 8/2004 | Crockett | | G10L 15/04 381/56 |
| 2006/0085188 A1* | 4/2006 | Goodwin | | G10L 15/04 704/245 |
| 2006/0271362 A1* | 11/2006 | Katou | | G10L 21/0208 704/233 |
| 2008/0228470 A1* | 9/2008 | Hiroe | | G10L 21/0272 704/200 |
| 2009/0005890 A1* | 1/2009 | Zhang | | G06F 17/30743 700/94 |
| 2009/0015651 A1* | 1/2009 | Togami | | G10L 21/00 348/14.01 |
| 2009/0022336 A1* | 1/2009 | Visser | | G10L 21/0272 381/94.7 |
| 2009/0043577 A1* | 2/2009 | Godavarti | | G10L 21/02 704/233 |
| 2009/0055169 A1* | 2/2009 | Goto | | G10L 19/008 704/200 |
| 2009/0154726 A1* | 6/2009 | Taenzer | | G10L 25/78 381/94.1 |
| 2009/0265167 A1* | 10/2009 | Ehara | | G10L 19/265 704/219 |
| 2009/0299756 A1* | 12/2009 | Davis | | G10L 19/008 704/500 |
| 2009/0319263 A1* | 12/2009 | Gupta | | G10L 19/10 704/229 |
| 2010/0004926 A1* | 1/2010 | Neoran | | G10L 25/48 704/201 |
| 2010/0017206 A1* | 1/2010 | Kim | | G10L 21/0272 704/233 |
| 2010/0057452 A1* | 3/2010 | Mukerjee | | G10L 15/02 704/232 |
| 2010/0082338 A1* | 4/2010 | Togawa | | G10L 21/02 704/221 |
| 2010/0121634 A1* | 5/2010 | Muesch | | G10L 21/0205 704/224 |
| 2010/0121637 A1* | 5/2010 | Roy | | G10L 15/22 704/235 |
| 2011/0054910 A1* | 3/2011 | Fujihara | | G10L 15/265 704/278 |
| 2011/0125494 A1* | 5/2011 | Alves | | G10L 21/0208 704/226 |
| 2011/0282666 A1* | 11/2011 | Washio | | G10L 17/26 704/246 |
| 2011/0305345 A1* | 12/2011 | Bouchard | | G10L 21/0208 381/23.1 |
| 2011/0307079 A1* | 12/2011 | Oweiss | | A61B 5/048 623/27 |
| 2012/0008790 A1* | 1/2012 | Bouse | | H04R 25/552 381/23.1 |
| 2012/0116754 A1* | 5/2012 | Borgstrom | | G10L 21/0208 704/205 |
| 2012/0123772 A1* | 5/2012 | Thyssen | | G10L 21/0208 704/226 |
| 2012/0130711 A1* | 5/2012 | Yamabe | | G10L 25/78 704/231 |
| 2012/0130713 A1* | 5/2012 | Shin | | G10L 25/78 704/233 |
| 2012/0173234 A1* | 7/2012 | Fujimoto | | G10L 15/20 704/233 |
| 2012/0253813 A1* | 10/2012 | Katagiri | | G10L 25/78 704/254 |
| 2013/0003987 A1* | 1/2013 | Furuta | | G10L 21/0208 381/94.3 |
| 2013/0029684 A1* | 1/2013 | Kawaguchi | | H04R 3/005 455/456.1 |
| 2013/0054234 A1* | 2/2013 | Kim | | G10L 21/0208 704/226 |
| 2013/0073283 A1* | 3/2013 | Yamabe | | G10L 21/0216 704/226 |
| 2013/0185068 A1* | 7/2013 | Tanaka | | G10L 15/08 704/233 |
| 2013/0197912 A1* | 8/2013 | Hayakawa | | G10L 17/005 704/246 |
| 2013/0218559 A1* | 8/2013 | Yamabe | | G01S 3/8083 704/226 |
| 2013/0218575 A1* | 8/2013 | Konishi | | G10L 25/60 704/275 |
| 2013/0246056 A1* | 9/2013 | Sugiyama | | G10L 21/02 704/205 |
| 2013/0289992 A1* | 10/2013 | Harada | | G10L 15/20 704/249 |
| 2013/0315403 A1* | 11/2013 | Samuelsson | | H04R 3/005 381/56 |
| 2013/0332163 A1* | 12/2013 | Onishi | | G10L 25/93 704/236 |
| 2013/0337796 A1* | 12/2013 | Suhami | | H04R 25/00 455/422.1 |
| 2014/0023199 A1* | 1/2014 | Giesbrecht | | G10L 21/0216 381/71.1 |
| 2014/0025374 A1* | 1/2014 | Lou | | G10L 21/0216 704/203 |
| 2014/0142957 A1* | 5/2014 | Sung | | G10L 19/005 704/500 |
| 2014/0249807 A1* | 9/2014 | Vaillancourt | | G10L 25/93 704/207 |
| 2014/0274203 A1* | 9/2014 | Ganong, III | | H04W 52/0251 455/556.1 |
| 2014/0355769 A1* | 12/2014 | Peters | | G10L 19/20 381/23 |
| 2015/0032445 A1* | 1/2015 | Souden | | G10L 21/0264 704/208 |
| 2015/0058013 A1* | 2/2015 | Pakhomov | | G10L 25/78 704/243 |
| 2015/0088509 A1* | 3/2015 | Gimenez | | G10L 17/22 704/243 |
| 2015/0112672 A1* | 4/2015 | Giacobello | | H04M 9/082 704/233 |
| 2015/0112681 A1* | 4/2015 | Tanaka | | G10L 15/08 704/249 |
| 2015/0221322 A1* | 8/2015 | Iyengar | | G10L 25/84 704/226 |
| 2015/0269933 A1* | 9/2015 | Yu | | G10L 15/16 704/232 |
| 2015/0340048 A1* | 11/2015 | Shioda | | G10L 21/02 704/225 |
| 2016/0049915 A1* | 2/2016 | Wang | | H03G 3/3089 381/107 |
| 2016/0155456 A1* | 6/2016 | Wang | | G10L 25/81 704/208 |

(56) References Cited

U.S. PATENT DOCUMENTS

| | | | |
|---|---|---|---|
| 2016/0217791 A1* | 7/2016 | Togawa | G10L 17/005 |
| 2016/0217808 A1* | 7/2016 | Tu | G10L 21/0272 |
| 2016/0225379 A1* | 8/2016 | Sung | G10L 19/035 |
| 2016/0240210 A1* | 8/2016 | Lou | G10L 21/0232 |
| 2016/0293174 A1* | 10/2016 | Atti | G10L 19/26 |
| 2016/0379669 A1* | 12/2016 | Bae | G10L 17/26 |
| | | | 704/232 |
| 2017/0004840 A1* | 1/2017 | Jiang | G10L 25/78 |
| 2017/0053653 A1* | 2/2017 | Sidi | G10L 17/02 |
| 2017/0098451 A1* | 4/2017 | Liu | G10L 19/022 |
| 2017/0125031 A1* | 5/2017 | Liu | G10L 19/22 |
| 2017/0140750 A1* | 5/2017 | Wang | G10L 15/02 |
| 2017/0155369 A1* | 6/2017 | Wang | H03G 3/3089 |
| 2018/0082690 A1* | 3/2018 | Warford | G10L 17/02 |
| 2019/0034766 A1* | 1/2019 | Chen | G06K 9/6269 |

FOREIGN PATENT DOCUMENTS

| | | | |
|---|---|---|---|
| JP | 2005227512 A | * | 8/2005 |
| JP | 2014-145838 A | | 8/2014 |
| WO | 2015/059946 A1 | | 4/2015 |

\* cited by examiner

FIG. 6

|  | VOICE | NON-VOICE | OTHER |
|---|---|---|---|
| VOICE | 799 | 20 | 8 |
| NON-VOICE | 140 | 685 | 110 |
| OTHER | 31 | 236 | 946 |

FIG. 7

|  | VOICE | NON-VOICE | OTHER |
|---|---|---|---|
| VOICE | 793 | 27 | 4 |
| NON-VOICE | 44 | 854 | 92 |
| OTHER | 0 | 89 | 1072 |

FIG. 11

|          | VOICE | NON-VOICE |
|----------|-------|-----------|
| VOICE    | 789   | 35        |
| NON-VOICE| 23    | 1138      |

FIG. 12

|          | VOICE | NON-VOICE |
|----------|-------|-----------|
| VOICE    | 810   | 14        |
| NON-VOICE| 203   | 958       |

FIG. 13

|          | VOICE | NON-VOICE |
|----------|-------|-----------|
| VOICE    | 787   | 37        |
| NON-VOICE| 24    | 1137      |

AUDIO PROCESSING APPARATUS AND AUDIO PROCESSING METHOD

CROSS-REFERENCE TO RELATED APPLICATION

Priority is claimed on Japanese Patent Application No. 2015-154215, filed Aug. 4, 2015, the content of which is incorporated herein by reference.

BACKGROUND OF THE INVENTION

Field of the Invention

The present invention relates to an audio processing apparatus and an audio processing method.

Description of Related Art

Conventionally, a sound source separation technology for separating a mixed sound generated from a plurality of sound sources into sounds of respective sound sources has been proposed. The sound source separation technology includes technology for determining whether a frame is a voice section or a non-voice section by comparing spectral power of an input audio signal with a predetermined threshold value for each frame. For example, an audio signal processing apparatus that detects a speech section output from a speaker sound source, optimizes a separation matrix if the audio signal processing apparatus detects the speech section, and separates a sound from the speaker sound source and a sound from a noise source from a mixed sound using the optimized separation matrix is described in JP 2005-227512 (hereinafter, Patent Document 1).

SUMMARY OF THE INVENTION

The audio signal processing apparatus described in Patent Document 1 detects the speech section in a step before separating the sound from the speaker sound source and the sound from the noise source. If a voice recognition process is performed on the separated sound from the speaker sound source, the non-voice section is contained in the section to be processed in the separated sound from the speaker sound source, and voice recognition accuracy may be degraded.

Aspects according to the present invention have been made in view of the above circumstances, and an object thereof is to provide an audio processing apparatus and an audio processing method capable of selecting a section for improving voice recognition accuracy.

To achieve the above object, the present invention adopts the following aspects.

(1) An audio processing device according to an aspect of the present invention includes a first-section detection unit configured to detect a first section that is a section in which a power of a spatial spectrum in a sound source direction is higher than a predetermined amount of power on the basis of an audio signal of a plurality of channels; a speech state determination unit configured to determine a speech state on the basis of an audio signal within the first section; a likelihood calculation unit configured to calculate a first likelihood that a type of sound source according to an audio signal within the first section is voice and a second likelihood that the type of sound source is non-voice; and a second-section detection unit configured to determine whether or not a second section in which power is higher than an average power of a speech section is a voice section on the basis of the first likelihood and the second likelihood within the second section.

(2) In the aspect (1), a vector space of a likelihood vector including the first likelihood and the second likelihood may include a voice area in which a type of sound source is voice and a non-voice area in which the type of sound source is a non-voice, and the second-section detection unit may detect a section in which the likelihood vector including the first likelihood and the second likelihood for each frame belongs to the voice area, as a voice section, from the first section.

(3) In the aspect (2), the second-section detection unit may detect the voice section on the basis of an identification boundary of the voice area in the vector space, and the identification boundary may be determined using at least a distribution of likelihood vectors based on an audio signal within the voice section.

(4) In the aspect (3), the identification boundary may be a portion in which a probability that a type of sound source is estimated to be voice on the basis of a distribution of the likelihood vectors based on an audio signal within a voice section in which a type of sound source is voice in the vector space is a predetermined probability.

(5) In the aspect (3), the identification boundary may be determined such that a discrepancy between a first group consisting of the likelihood vectors based on an audio signal within the voice section and a second group consisting of the likelihood vectors based on an audio signal within a non-voice section in which the type of sound source is non-voice further increases and each of a discrepancy between the likelihood vectors within the first group and a discrepancy of the likelihood vectors within the second group decreases.

(6) In any one of the aspects (1) to (5), the audio processing apparatus may include a sound source localization unit configured to calculate the spatial spectrum on the basis of the audio signal of a plurality of channels, and determines a sound source direction on the basis of the spatial spectrum; and a sound source separation unit configured to separate an audio signal of each sound source on the basis of a transfer function from the sound source direction, from the audio signal of a plurality of channels within the first section.

(7) In the aspect (6), the sound source localization unit may calculate the spatial spectrum using a multiple signal classification method or a beam forming method.

(8) An audio processing method according to an aspect of the present invention includes a first-section detection step of detecting a first section that is a section in which a power of a spatial spectrum in a sound source direction is higher than a predetermined amount of power on the basis of an audio signal of a plurality of channels; a speech state determination step of determining a speech state on the basis of an audio signal within the first section; a likelihood calculation step of calculating a first likelihood that a type of sound source according to an audio signal within the first section is voice and a second likelihood that the type of sound source is non-voice; and a second-section detection step of determining whether or not a second section in which power is higher than an average power of a speech section is a voice section on the basis of the first likelihood and the second likelihood within the second section.

According to the above-described aspects (1) and (8), it is possible to accurately determine whether or not, from the audio signal within a space in which a spatial spectrum in which the sound source is highly likely to be present is high, which is a section in which the power is high, the relevant section is the voice section from the first likelihood that the type of sound source is voice and the second likelihood that the type of sound source is non-voice. Therefore, the audio signal within the section determined to be the voice section is set as a target of the voice recognition process, which improves voice recognition accuracy.

In the case of the above-described aspect (2), it is possible to identify the voice section and the non-voice section more accurately than a simple comparison between the first likelihood and the second likelihood.

In the case of the above-described aspect (3), since it can be determined whether or not the likelihood vector belongs to the voice area through a simple process, the amount of calculation or a hardware scale is prevented from excessively increasing.

In the case of the above-described aspect (4), it is possible to use an area in which the probability that the type of sound source is estimated to be voice is higher than a predetermined probability as the voice area to detect the voice section based on the likelihood vector.

In the case of the above-described aspect (5), the identification boundary can divide a vector section into the voice area and the non-voice area such that the likelihood vectors within the first group and the likelihood vectors within the second group coexist as little as possible. Therefore, detection accuracy of the voice section based on the likelihood vector is improved.

In the case of the above-described aspect (6), since the spatial spectrum used for detection of the first section is used for sound source localization, and information on the sound source direction determined through the sound source localization is used for source separation, information such as the spatial spectrum obtained through the process until the sound-source-specific audio signal of a voice section determination target is acquired from the audio signal of a plurality of channels is utilized in a determination of the voice section, and an excessive increase in system scale is avoided.

In the case of the above-described aspect (7), since the power of the spectrum calculated using the multiple signal classification method or the beam forming method can be used to detect the first section, an excessive increase in system scale is avoided.

BRIEF DESCRIPTION OF THE DRAWINGS

FIG. 6 is a table illustrating an example of a verification result according to the first embodiment.

FIG. 7 is a table illustrating another example of the verification result according to the first embodiment.

FIG. 11 is a table illustrating an example of a verification result according to the second embodiment.

FIG. 12 is a table illustrating another example of the verification result according to the second embodiment.

FIG. 13 is a table illustrating still another example of the verification result according to the second embodiment.

DETAILED DESCRIPTION OF THE INVENTION

First Embodiment

Hereinafter, a first embodiment of the present invention will be described with reference to the drawings.

Figure 1:
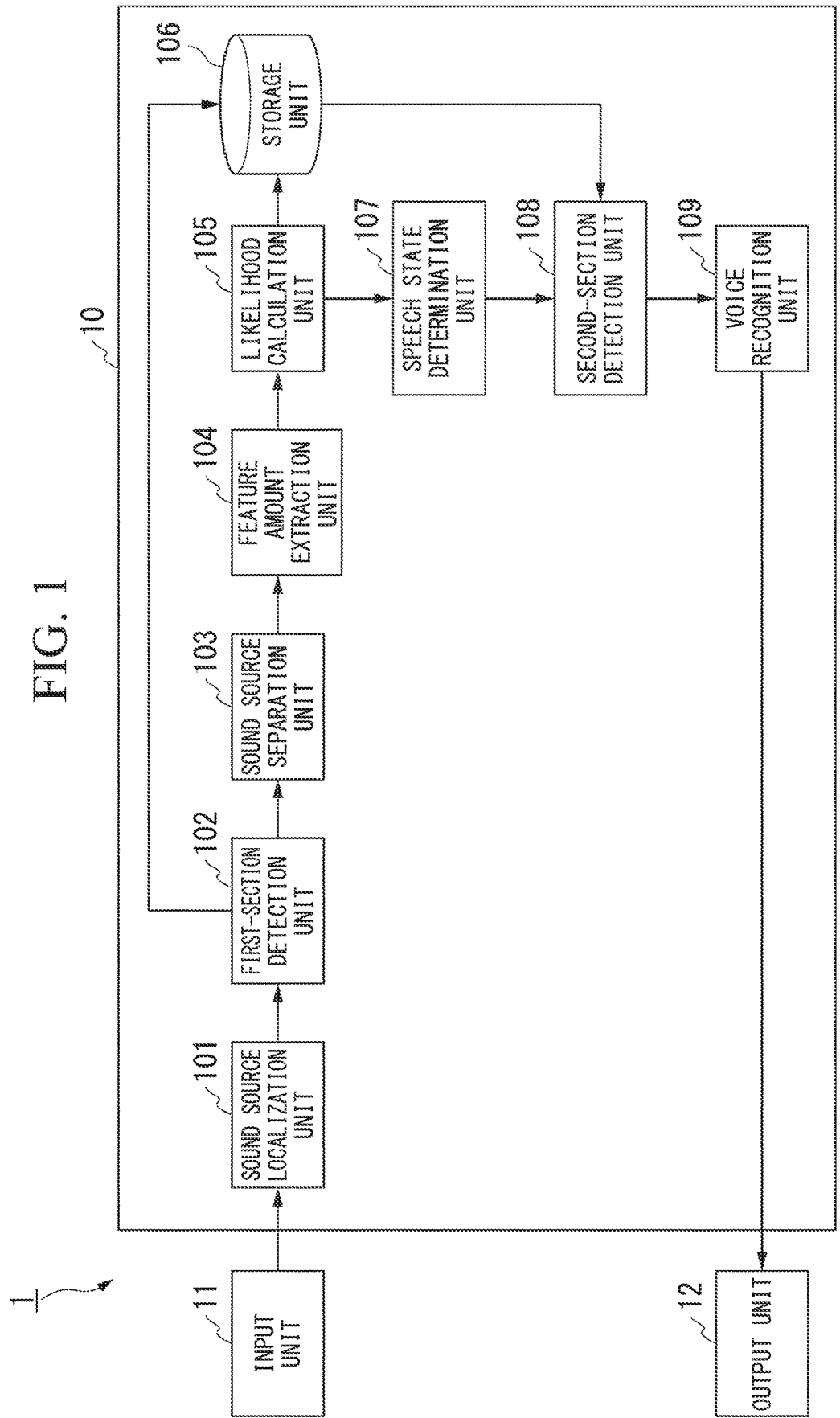
FIG. 1 is a block diagram illustrating a configuration of an audio processing system according to a first embodiment.

FIG. 1 is a block diagram illustrating a configuration of an audio processing system 1 according to this embodiment.

The audio processing system 1 includes an audio processing apparatus 10, an input unit 11, and an output unit 12.

The audio processing apparatus 10 calculates the power of a spatial spectrum for an audio signal of P (P is an integer equal to or greater than 2) channels input from the input unit 11 and detects a first section in which the calculated power is higher than a predetermined amount of power. The audio processing apparatus 10 determines a speech state on the basis of the audio signal within the first detected section and detects a second section in which power is higher than average power in the speech section to which the first section belongs. The audio processing apparatus 10 determines whether or not a type of sound source is voice with respect to the audio signal in the detected second section. The audio processing apparatus 10 outputs speech data representing speech content obtained by performing a voice recognition process on the audio signal within the voice section in which the type of sound source is determined as voice, to the output unit 12.

The input unit 11 receives an audio signal of P channels and outputs the input audio signal to the audio processing apparatus 10. The input unit 11 is, for example, a microphone array in which P electro-acoustic conversion elements (microphones) are arranged in different positions. The input unit 11 may wirelessly transmit a recorded audio signal to the audio processing apparatus 10, or may transmit the audio signal by wire. A position of the input unit 11 may be fixed or may be installed in a mobile body such as a robot or a vehicle and be movable. The input unit 11 may be formed integrally with the audio processing apparatus 10 or may be a separate entity. The input unit 11 may be a data input interface to which an audio signal from another device is input.

The output unit 12 outputs the speech data input from the audio processing apparatus 10. The output unit 12 is, for example, a display device that displays characters, figures, images, or the like. The display device can display information on speech content indicated by the speech data in a visible form such as text or an image. The output unit 12 may be a data output interface that outputs the speech data to another device. The output unit 12 may be a data input and output interface configured integrally with the input unit 11.

The audio processing apparatus 10 includes a sound source localization unit 101, a first-section detection unit 102, a sound source separation unit 103, a feature amount extraction unit 104, a likelihood calculation unit 105, a storage unit 106, a speech state determination unit 107, a second-section detection unit 108, and a voice recognition unit 109.

The sound source localization unit 101 determines a direction of each sound source for each frame having a predetermined length (for example, 50 ms) on the basis of the audio signal of P channels input from the input unit 11 (sound source localization). The sound source localization unit 101 calculates, for example, a spatial spectrum representing power for each direction using a multiple signal classification (MUSIC) method in the sound source localization. The sound source localization unit 101 determines the sound source direction of each sound source on the basis of the spatial spectrum. The sound source localization will be described below. The sound source localization unit 101 outputs sound source direction information indicating the determined sound source direction of each sound source and the audio signal of P channels to the first-section detection unit 102.

The first-section detection unit 102 receives the sound source direction information and the audio signal of P channels from the sound source localization unit 101. The first-section detection unit 102 detects a section in which the power of the spatial spectrum for each sound source is higher than a predetermined power threshold as the first section with respect to the sound source direction indicated by the sound source direction information. The first-section detection unit 102 extracts the sound source direction information and the audio signal of P channels in the first detected section from the input sound source direction information and the input audio signal of P channels. The first-section detection unit 102 outputs the extracted sound source direction information and the extracted audio signal of P channels to the sound source separation unit 103.

The sound source separation unit 103 receives the sound source direction information and the audio signal of P channels from the first-section detection unit 102. The sound source separation unit 103 separates the audio signal of P channels into sound-source-specific audio signals that are audio signals for respective sound sources on the basis of the sound source directions indicated by the sound source direction information. When separating the sound-source-specific audio signals, the sound source separation unit 103 uses, for example, a geometric-constrained high-order decorrelation-based source separation (GHDSS) method. Hereinafter, a sound-source-specific audio signal of a sound source k in a frame f is referred to as $S_k(f)$. The sound source separation unit 103 outputs the separated sound-source-specific audio signal of each sound source to the feature amount extraction unit 104.

The feature amount extraction unit 104 calculates a voice feature amount for each frame having a predetermined length with respect to the sound-source-specific audio signal of each sound source that is input from the sound source separation unit 103. The voice feature amount is, for example, mel-frequency cepstrum coefficients (MFCC) or a mel-frequency log spectrum (MFLS). The feature amount extraction unit 104 outputs the voice feature amount calculated for each sound source and each frame, and the sound-source-specific audio signals to the likelihood calculation unit 105.

The likelihood calculation unit 105 calculates, for a voice feature amount $X_k(f)$ for each sound source k and each frame f input from the feature amount extraction unit 104, a likelihood $p(X_k(f)|\lambda_1)$ (hereinafter referred to as a first likelihood) that a type of sound source indicated by the audio signal according to the voice feature amount is voice and a likelihood $p(X_k(f)|\lambda_2)$ (hereinafter referred to as a second likelihood) that the type of sound source indicated by the audio signal according to the voice feature amount is non-voice. In the calculation of the first likelihood $p(X_k(f)|\lambda_1)$ and the second likelihood $p(X_k(f)|\lambda_2)$, the likelihood calculation unit 105 uses an acoustic model prestored in the storage unit 106. The acoustic model is, for example, a Gaussian mixture model (GMM). The likelihood calculation unit 105 stores likelihood information indicating the first likelihood $p(X_k(f)|\lambda_1)$ and the second likelihood $p(X_k(f)|\lambda_2)$ calculated for each sound source and each frame, and the sound-source-specific audio signal in the storage unit 106 in association with each other, and outputs the sound-source-specific audio signal to the speech state determination unit 107.

The speech state determination unit 107 determines the speech state of the sound source indicated by the sound-source-specific audio signal input from the likelihood calculation unit 105. In this step, it is not determined whether the sound source indicated by the sound-source-specific audio signal is voice indicating speech of a human or non-voice that is another type of sound source. Therefore, in the following description, the speech is not necessarily limited to generating voice for delivery of language information, and refers to a human or a voice synthesis apparatus generating sound or the sound emitted by the human or the voice synthesis apparatus. The speech state determination unit 107 determines whether there is speech in each sound source on the basis of the sound-source-specific audio signal of each sound source and each frame. The speech state determination unit 107, for example, determines that a speech state of the sound-source-specific audio signal of the frame is speech if the power is equal to or higher than a predetermined power threshold, and determines that the speech state of the sound-source-specific audio signal of the frame is not speech if the power is lower than the predetermined power threshold. The speech state determination unit 107 may determine that the speech state is speech if the number of zero crossings is in a range of the predetermined number of zero crossings (for example, 200 to 500 Hz) for a frame in which the power is equal to or higher than the predetermined power threshold, and determine that the speech state is not speech if the number of zero crossings is out of the range of the predetermined number of zero crossings.

If speech is determined to be performed in a frame immediately after the frame in which it is determined that there is no speech, the speech state determination unit 107 determines that the speech state of the frame immediately after the frame in which no speech is determined is speech start. If it is determined that there is no speech in a frame immediately after the frame in which the speech is performed, the speech state determination unit 107 determines that the speech state of the frame in which the speech is determined to be performed is speech end. The speech state determination unit 107 determines that a section including frames in which the speech is determined to be performed from the frame determined to be in the speech start state to the frame determined to be in the speech end is one speech section. The speech state determination unit 107 outputs speech state information indicating the speech state of each frame to the second-section detection unit 108.

The second-section detection unit 108 refers to the speech state information input from the speech state determination unit 107 and calculates, for each sound source, average power within a speech section to which the frame at a time point thereof belongs, from the sound source and the sound-source-specific audio signal of each frame read from the storage unit 106. The second-section detection unit 108 determines whether a frame of which the power is higher than the calculated average power in the speech section as the second section is a voice section or a non-voice section on the basis of the first likelihood $p(X_k(f)|\lambda_1)$ and the second likelihood $p(X_k(f)|\lambda_2)$ of each frame. The second-section detection unit 108 discards frames determined to be the non-voice section, and outputs the voice feature amount of frames determined to be the voice section to the voice recognition unit 109. Here, the voice section refers to a section in which the type of the sound source is voice, that is, that has a specific phoneme, and the non-voice section refers to a section in which the type of the sound source is a sound other than voice, such as a musical sound, sound effects, or an operation sound of machine.

The voice recognition unit 109 performs a voice recognition process using the voice feature amount of the frame input from the second-section detection unit 108 and a voice recognition model prestored in the storage unit 106. The voice recognition model includes an acoustic model and a language model. The acoustic model is used to determine a phoneme string including one or a plurality of phonemes from the voice feature amount. The acoustic model is, for example, a hidden Markov model (HMM). The language model is used to determine a word including a phoneme string. The language model is, for example, an n-gram. The voice recognition unit 109 determines a phrase in which the likelihood calculated using the voice recognition model for the input voice feature amount is highest, as a recognition result. The voice recognition unit 109 outputs text data indicating the recognition result as speech content of each sound source to the output unit 12.

(Sound Source Localization)

Next, the MUSIC method which is one sound source localization scheme will be described.

The MUSIC method is a scheme of determining a sound source direction w in which power $P_{ext}(\psi)$ of a spatial spectrum to be described below is maximum and is higher than a predetermined level. A transfer function for each sound source direction $\psi$ distributed at a predetermined interval (for example, 5°) is prestored in the storage unit 106. The sound source localization unit 101 generates, for each sound source direction $\psi$, a transfer function vector $[D(\psi)]$ having, as an element, a transfer function $D_{[p]}(\omega)$ from the sound source to a microphone corresponding to each channel p (p is an integer equal to or greater than 1 and smaller than or equal to P).

The sound source localization unit 101 calculates a conversion coefficient $x_p(\omega)$ by converting an acoustic signal $x_p(t)$ (t is a time) of each channel p into a frequency domain for each frame having a predetermined number of samples. The sound source localization unit 101 calculates an input correlation matrix $[R_{xx}]$ shown in Equation (1) from an input vector $[x(\omega)]$ including the calculated conversion coefficient as an element.

[Equation 1]

$$[R_{xx}]=E[[x(\omega)][x(\omega)]^*] \quad (1)$$

In Equation (1), E[ . . . ] indicates an expected value of . . . . [ . . . ]* indicates a conjugate transpose of a matrix or a vector.

The sound source localization unit 101 calculates an eigenvalue $\delta_i$ and an eigenvector $[e_i]$ of the input correlation matrix $[R_{xx}]$. The input correlation matrix $[R_{xx}]$, the eigenvalue $\delta_i$, and the eigenvector $[e_i]$ have the relationship shown in Equation (2).

[Equation 2]

$$[R_{xx}][e_i]=\delta_i[e_i] \quad (2)$$

In Equation (2), i is an integer equal to or greater than 1 and smaller than or equal to P. An order of the index i is a descending order of an eigenvalue $\delta_i$.

The sound source localization unit 101 calculates the power $P_{sp}(\psi)$ of a frequency-specific space spectrum shown in Equation (3) on the basis of the transfer function vector $[D(\psi)]$ and the calculated eigenvector $[e_i]$.

[Equation 3]

$$P_{sp}(\phi) = \frac{|[D(\phi)]^*[D(\phi)]|}{\sum_{i=K+1}^{P}|[D(\phi)]^*[e_i]|} \quad (3)$$

In Equation (3), K is the maximum number (for example, 2) of sound sources that can be detected. K is a predetermined natural number that is smaller than P.

The sound source localization unit 101 calculates a sum of the spatial spectrum $P_{sp}(\psi)$ in a frequency band in which an S/N ratio is higher than a predetermined threshold (for example, 20 dB) as power $P_{ext}(\psi)$ of the spatial spectrum in the entire band.

The sound source localization unit 101 may calculate a sound source position using other schemes in place of the MUSIC method. For example, a weighted delay and sum beam forming (WDS-BF) method is available. The WDS-BF method is a scheme of calculating a square value of a delay and sum of the acoustic signal $x_p(t)$ in the entire band of each channel p as power $P_{ext}(\psi)$ of a space spectrum as shown in Equation (4), and searching for a sound source direction $\psi$ in which the power $P_{ext}(\psi)$ of the spatial spectrum is maximized.

[Equation 4]

$$P_{ext}(\phi)=[D(\phi)]^*E[[x(t)][x(t)]^*][D(\phi)] \quad (4)$$

In Equation (4), a transfer function represented by each element of $[D(\psi)]$ indicates a contribution due to a delay of a phase from the sound source to a microphone corresponding to each channel p (p is an integer equal to or greater than 1 and equal to or smaller than P), and attenuation is neglected. That is, an absolute value of the transfer function of each channel is 1. [X(t)] is a vector having a signal value of an acoustic signal $x_p(t)$ of each channel p at that point in time as an element.

(Sound Source Separation)

Next, the GHDSS method which is one sound source separation scheme will be described.

The GHDSS method is a scheme of adaptively calculating a separation matrix $[V(\omega)]$ so that each of two cost functions, that is, a separation sharpness $J_{SS}([V(\omega)])$ and a geometric constraint $J_{GC}([V(\omega)])$, is reduced. The separation matrix $[V(\omega)]$ is a matrix by which the audio signal $[x(\omega)]$ of P channels input from the sound source localization unit 101 is multiplied, and that is used to calculate an audio signal (estimated value vector) $[u'(\omega)]$ for each sound source of K channels. Here, $[ \ldots ]^T$ indicates a transpose of a matrix or a vector.

The separation sharpness $J_{SS}([V(\omega w)])$ and the geometric constraint $J_{GC}([V(\omega)])$ are expressed as Equations (5) and (6), respectively.

[Equation 5]

$$J_{SS}([V(\omega)])=\|\phi([u'(\omega)])[u'(\omega)]^*-\mathrm{diag}[\phi([u'(\omega)])[u'(\omega)]^*]\|^2 \quad (5)$$

[Equation 6]

$$J_{GC}([V(\omega)])=\|\mathrm{diag}[[V(\omega)][D(\omega)]-[I]]\|^2 \quad (6)$$

In Equations (5) and (6), $\|\ldots\|^2$ is a Frobenius norm of a matrix . . . . The Frobenius norm is a square sum (scalar value) of respective element values constituting the matrix. $\phi([u'(\omega)])$ is a non-linear function of the audio signal $[u'(\omega)]$, such as a hyperbolic tangent function. diag[ . . . ] indicates a total sum of diagonal elements of the matrix . . . . Accordingly, the separation sharpness $J_{SS}([V(\omega)])$ is an index value representing magnitude of a non-diagonal element between channels of the spectrum of the audio signal (estimated value), that is, a degree of erroneous separation of one certain sound source as another sound source. Further, in Equation (6), [I] indicates a unit matrix. Therefore, the geometric constraint $J_{GC}([V(\omega)])$ is an index value representing a degree of an error between the spectrum of the audio signal (estimated value) and the spectrum of the audio signal (sound source).

Figure 2:
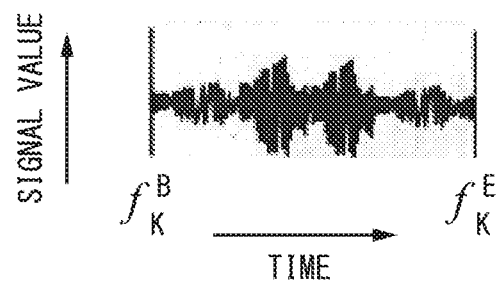
FIG. 2 is a diagram illustrating an example of a sound-source-specific audio signal.

FIG. 2 is a diagram illustrating an example of the sound-source-specific audio signal separated by the sound source separation unit 103. FIG. 2 illustrates a temporal change of a signal value of the sound-source-specific audio signals $S_k(f)$ of the sound source k in a speech section from a speech start frame $f_k^B$ to a speech end frame $f_k^E$. A waveform thereof is a waveform within the first section in which the power of the spatial spectrum in the direction of the sound source k is higher than the predetermined amount of power, and shows that components caused by speech of other persons who are other sources have been separated.

Figure 3:
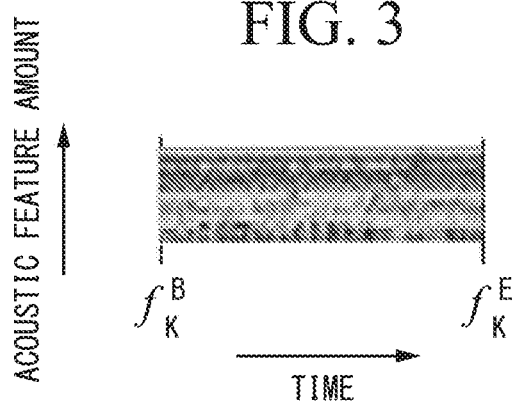
FIG. 3 is a diagram illustrating an example of a voice feature amount.

FIG. 3 is a diagram illustrating an example of the voice feature amount calculated by the feature amount extraction unit 104. FIG. 3 illustrates a temporal change in the MFCC calculated for each frame with respect to the sound-source-specific audio signal $S_k(f)$ in the speech section from a speech start frame $f_k^B$ to a speech end frame $f_k^E$ by light and shade. In FIG. 3, a higher order signal value is represented in an upper portion, and a bright portion is shown to have a greater signal value than a dark portion. The calculated voice feature amount is used for the likelihood calculation unit 105 to calculate the likelihood that a type of sound source indicated by the sound-source-specific audio signal is voice or non-voice.

(Likelihood Calculation)

Next, a process of using the GMM as a likelihood calculation scheme will be described.

The GMM is a type of acoustic model for calculating an output probability for an input voice feature amount by performing weighted addition using a plurality of normal distributions as a base. Model variables of the GMM include a mixture weight $C_{im}$, a mean value $[\mu_{im}]$, and a covariance matrix $[\Sigma_{im}]$. Here, m indicates an individual base, and i indicates a speech state at that point in time. The model variables are given for each class. The likelihood is calculated by accumulating the output probability of each frame. The accumulation includes both of sequential multiplying in a linear area and sequential adding in a log domain. In the calculation of the likelihood, the likelihood calculation unit 105 may normalize the accumulated output probability using the number of frames according to the accumulation of the output probability.

In this embodiment, for the voice feature amount for each frame for which the type of sound source is known to be voice or non-voice, a (maximization) model variable is determined using the GMM in advance so that each of the first likelihood and the second likelihood increases.

(Determination of Voice Section and Non-Voice Section)

Next, a scheme of determining whether a frame is a voice section or a non-voice section will be described.

The second-section detection unit 108 calculates, for example, average power $P_k'$ within the speech section indicated by the speech state information from the sound-source-specific audio signal $S_k(f)$ for each frame f for each sound source k using Equation (7).

[Equation 7]

$$P_k' = \frac{1}{f_k^E - f_k^B + 1} \sum_{f=f_k^B}^{f_k^B} |S_k(f)|^2 \qquad (7)$$

In Equation (7), $|S_k(f)|^2$ is the power of the sound-source-specific audio signal in the frame f of the sound source k.

Then, the second-section detection unit 108 determines that a frame of which the power is lower than or equal to the average power $P_k'$ is a non-voice section. The second-section detection unit 108 determines that a frame of which the power is higher than the average power $P_k'$ is a frame belonging to a second section for determining whether the frame is a voice section or a non-voice section using the first likelihood $p(X_k(f)|\lambda_1)$ and the second likelihood $p(X_k(f)|\lambda_2)$. Schemes of determining whether the frame is a voice section or a non-voice section include, for example, a cumulative likelihood method, and a majority method.

In the cumulative likelihood method, the second-section detection unit 108 sequentially multiplies the first likelihood $p(X_k(f)|\lambda_1)$ of each frame between the frames f within the second section to calculate a cumulative likelihood $p'(X_k|\lambda_1)$ according to the voice (hereinafter referred to as a first cumulative likelihood). Further, the second-section detection unit 108 sequentially multiplies the second likelihood $p(X_k(f)|\lambda_1)$ of each frame between the frames f within the second section to calculate a cumulative likelihood $p'(X_k|\lambda_2)$ according to the non-voice (hereinafter referred to as a second cumulative likelihood). The first cumulative likelihood $p'(X_k|\lambda_1)$ and the second cumulative likelihood $p'(X_k|\lambda_1)$ are represented by Equations (8) and (9), respectively.

[Equation 8]

$$p'(X_k|\lambda_1) = \prod_{f=f_k^B}^{f_k^E} p(X_k(f)|\lambda_1) \qquad (8)$$

[Equation 9]

$$p'(X_k|\lambda_2) = \prod_{f=f_k^B}^{f_k^E} p(X_k(f)|\lambda_2) \qquad (9)$$

The second-section detection unit 108 determines that the second section is a voice section when the first cumulative likelihood $p'(X_k|\lambda_1)$ is higher than the second cumulative likelihood $p'(X_k|\lambda_2)$, and determines that the second section is a non-voice section when the first cumulative likelihood $p'(X_k|\lambda_1)$ is lower than or equal to the second cumulative likelihood $p'(X_k|\lambda_2)$.

In the majority method, the second-section detection unit 108 counts the number of frames in which the first likelihood $p(X_k(f)|\lambda_1)$ is higher than the second likelihood $p(X_k(f)|\lambda_2)$ among the frames within the second section. The second-section detection unit 108 determines that the second section is a voice section when a proportion of the counted number exceeds a predetermined proportion (for example, 0.5).

Specifically, the second-section detection unit 108 determines an identification value π ($X_k(f)$) for each frame f according to Equation (10).

[Equation 10]

$$\pi_k = \begin{cases} 1 & (p(X_k(f)|\lambda_1) > p(X_k(f)|\lambda_2)) \\ 0 & \text{(otherwise)} \end{cases} \quad (10)$$

The second-section detection unit 108 accumulates the determined identification value $\pi(X_k(f))$ within the second section, and divides an accumulated value obtained through the accumulation by the frame number $f_k^E - f_k^B + 1$ in the second section to calculate a proportion $\pi_k'$, as shown in Equation (11).

[Equation 11]

$$\pi_k' = \frac{1}{f_k^E - f_k^B + 1} \sum_{f=f_k^B}^{f_k^E} \pi(X_k(f)) \quad (11)$$

The second-section detection unit 108 determines that the second section is a voice section when the proportion $\pi_k'$ is greater than 0.5, and otherwise determines that the second section is a non-voice section.

Figure 4:
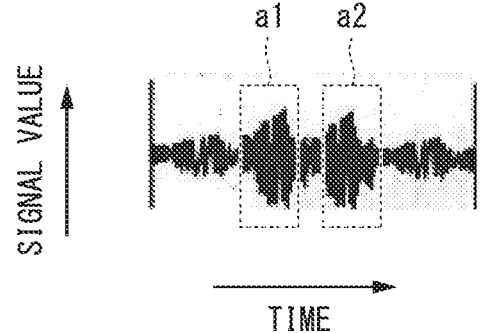
FIG. 4 is an example illustrating an example of a determination target section.

FIG. 4 is a diagram illustrating an example of the second sections determined by the second-section detection unit 108. Two frames illustrated in FIG. 4 indicate the second sections a1 and a2 determined by the second-section detection unit 108 with respect to the sound-source-specific audio signal illustrated in FIG. 2. Since frames of which the power is lower than or equal to the average power within the speech section are discarded, a portion in which a component of the sound source other than various noises becomes dominant as a sound-source-specific audio signal becomes a determination target. Therefore, the second-section detection unit 108 can accurately determine whether the sound source of the sound-source-specific audio signal is voice or non-voice.

(Audio Processing)

Next, audio processing according to this embodiment will be described.

Figure 5:
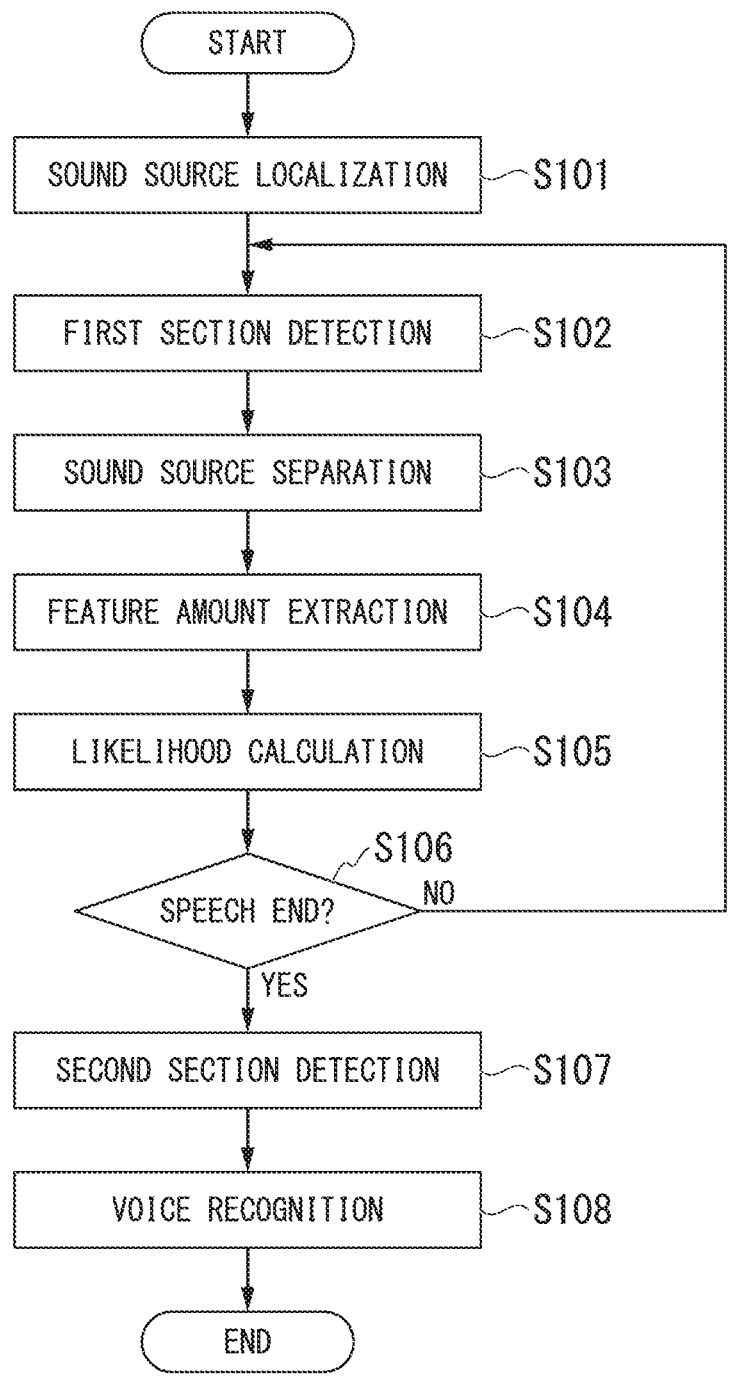
FIG. 5 is a flowchart illustrating audio processing according to the first embodiment.

FIG. 5 is a flowchart illustrating audio processing according to this embodiment.

(Step S101) The sound source localization unit 101 calculates a spatial spectrum having power in each direction on the basis of the audio signal of P channels from the input unit 11. The sound source localization unit 101 determines the sound source direction of each sound source on the basis of the calculated spatial spectrum. Thereafter, the process proceeds to step S102.

(Step S102) The first-section detection unit 102 detects a section in which the power of the spatial spectrum of each frame is higher than a predetermined power threshold as a frame belonging to the first section. Thereafter, the process proceeds to step S103. However, for a frame not detected as the first section, a process of step S103 is performed on the next frame.

(Step S103) The sound source separation unit 103 separates the audio signal of P channels within the first section into a sound-source-specific audio signal of each sound source on the basis of the sound source direction of each sound source. Thereafter, the process proceeds to step S104.

(Step S104) The feature amount extraction unit 104 calculates a predetermined type of voice feature amount for each frame for the sound-source-specific audio signal of each audio source. Thereafter, the process proceeds to step S105.

(Step S105) The likelihood calculation unit 105 calculates the first likelihood $p(X_k(f)|\lambda_1)$ that the type of sound source is voice and the second likelihood $p(X_k(f)|\lambda_2)$ that the type of sound source is non-voice for the voice feature amount $X_k(f)$, for each sound source k and each frame f. Thereafter, the process proceeds to step S106.

(Step S106) The speech state determination unit 107 calculates the power of the sound-source-specific audio signal of each sound source and each frame to determine whether or not the frame is a speech section in which a speech state in the frame is speech or a non-speech section in which the speech state is not speech. The speech state determination unit 107 determines whether the frame is a speech end frame on the basis of this determination. If the frame is determined to be the speech end frame (YES in step S106), the process proceeds to step S107. If the frame is not determined to be the speech end frame (NO in step S106), the process proceeds to step S102, and a processing target frame is changed to a next frame.

(Step S107) The second-section detection unit 108 determines whether a frame of which the power is higher than the calculated average power in the speech section is a voice section or a non-voice section on the basis of the first likelihood $p(X_k(f)|\lambda_1)$ and the second likelihood $p(X_k(f)|\lambda_2)$ of each frame. Thereafter, the process proceeds to step S108.

(Step S108) The voice recognition unit 109 performs a voice recognition process on voice feature amounts of a series of frames determined to be the voice section, and outputs text data indicating a recognition result as speech content of each sound source to the output unit 12. Then, the process illustrated in FIG. 5 ends.

The second-section detection unit 108 may perform the following determinations using the first cumulative likelihood $p'(X_k|\lambda_1)$ and the second cumulative likelihood $p'(X_k|\lambda_2)$.

(i) If $p'(X_k|\lambda_1)$ is higher than $\alpha \cdot p'(X_k|\lambda_2)$, the second-section detection unit 108 determines that the second section is a voice section.

(ii) If $p'(X_k|\lambda_1)$ is smaller than $\alpha^{-1} \cdot p'(X_k|\lambda_2)$, the second-section detection unit 108 determines that the second section is a non-voice section.

(iii) If $p'(X_k|\lambda_1)$ is equal to or greater than $\alpha^{-1} \cdot p'(X_k|\lambda_2)$ and smaller than or equal to $\alpha \cdot p'(X_k|\lambda_2)$, the second-section detection unit 108 determines that the second section is another section that does not belong to the voice section and the non-voice section. Here, σ is a predetermined real number greater than 1 and is, for example, 1.5. The audio signal within the other section may not be determined to be either the voice or non-voice since the audio signal has intermediate characteristics between the voice and the non-voice.

Further, the second-section detection unit 108 may perform the following determinations using the proportion $\pi_k'$.

(i) If the proportion $\pi_k'$ is higher than 0.5+β, the second-section detection unit 108 determines that the second section is a voice section.

(ii) If the proportion $\pi_k'$ is lower than the 0.5−β, the second-section detection unit 108 determines that the second section is a non-voice section.

(iii) If the proportion $\pi_k'$ is equal to or higher than 0.5−β and lower than or equal to 0.5+β, the second-section detection unit 108 determines that the second section is the other section. Here, α is a predetermined real number greater than 0 and smaller than 0.5 and is, for example, 0.1.

(Evaluation Experiment)

Next, an evaluation experiment performed on the audio processing apparatus 10 according to this embodiment will be described.

The evaluation experiment was performed under the following conditions. A sampling frequency of the audio signal: 16000 [Hz], the number of channels P: 8, the number of samples within one frame (the number of FFT points): 512, a shift length: 160, and indoor reverberation time RT20: 1.0 [s]

A sound collection unit 11 was a microphone array installed in the head of a humanoid robot. Eight microphones included in the sound collection unit 11 were arranged at regular intervals on a circle centered on a parietal portion of the robot. Both of a target sound source and a noise source that were determination targets were used as sound sources. The target sound source was installed at a position 1.5 m from the front of the robot, whereas a plurality of noise sources were installed in directions other than the front of the robot. In each trial, both the target sound source and the noise source were caused to generate sounds. In each trial, the noise source that generated noise was selected at random from the plurality of noise sources. As content of the target sound source, 824 samples of voice, 990 samples of non-voice (for example, musical sound or sound effects), and other 1161 sound sources were used. In each trial, any one of the total of 2975 pieces of content was selected at random. In each trial, the audio processing apparatus 10 was caused to determine whether a type of target sound source was voice, non-voice, or something else. In the accumulation of verification results, the number of times of the voice was determined, the number of times the non-voice was determined, and the number of times something else was determined were counted for each type of sound source. For a comparison of the verification results, a process of discarding the frame of which the power of the sound-source-specific audio signal was lower than or equal to the average power among frames belonging to the first section was omitted in the second-section detection unit 108, and the audio processing apparatus 10 was caused to determine the type of target sound source (no 2-hierarchical section detection).

(Verification Result)

FIGS. 6 and 7 are tables showing examples of respective verification results. The verification result illustrated in FIG. 6 shows the number of times each type of target sound source was determined without 2-hierarchical section detection. FIG. 7 illustrates the number of times each type of target sound source was determined by the audio processing according to this embodiment. In FIGS. 6 and 7, each row indicates a type of known target sound source, and each column illustrates a type of determined sound source. For example, in FIG. 6, a second row shows that the numbers of times the type of sound source was determined as voice, non-voice, and something else as 799, 20, and 8, respectively, among the total of 827 times in a case in which the type of target sound source was voice, respectively. From the result of the determination without 2-hierarchical section detection illustrated in FIG. 6, an accuracy rate at which the voice section, the non-voice section, and the other section were correctly determined was 81.68%. On the other hand, from the verification result of this embodiment illustrated in FIG. 7, the accuracy rate was 91.39%. The results illustrated in FIGS. 6 and 7 show that it can be more accurately determined whether the frame is the voice section, the non-voice section, or another section through the detection of the first section and the 2-hierarchical section detection for narrowing down a determination target section using a section in which the power is higher than the average power as the second section from the first section, as in this embodiment. It is possible to improve recognition accuracy by performing the voice recognition process using the voice feature amount within the section accurately determined to be the voice section.

As described above, the audio processing apparatus 10 according to this embodiment includes the first-section detection unit 102 that detects the first section that is a section in which the power of the spatial spectrum in the sound source direction is higher than the predetermined amount of power on the basis of the audio signal of a plurality of channels. The audio processing apparatus 10 includes the speech state determination unit 107 that determines the speech state on the basis of the audio signal within the first section, and the likelihood calculation unit 105 that calculates the first likelihood that the type of sound source according to the audio signal within the first section is voice and the second likelihood that the type of sound source is non-voice. The audio processing apparatus 10 includes the second-section detection unit 108 determines whether the second section is a voice section on the basis of the first likelihood and the second likelihood within the second section in which the power is higher than the average power of the speech section.

According to this configuration, it is possible to accurately determine, from the audio signal within a space in which a spatial spectrum in which the sound source is highly likely to be present is high, which is a section in which the power is high, whether or not the relevant section is the voice section from the first likelihood that the type of sound source is voice and the second likelihood that the type of sound source is non-voice. Therefore, the audio signal within the section determined to be the voice section is set to as a target of the voice recognition process, which improves voice recognition accuracy.

Further, the audio processing apparatus 10 includes the sound source localization unit 101 that calculates the spatial spectrum on the basis of the audio signal of a plurality of channels and determines the sound source direction on the basis of the spatial spectrum, and the sound source separation unit 103 that separates the audio signal of each sound source from the audio signal of the plurality of channels within the first section on the basis of the transfer characteristics from the sound source direction.

With this configuration, the spatial spectrum used for detection of the first section is used for sound source localization, and information on the sound source direction determined through the sound source localization is used for source separation. Therefore, information such as the spatial spectrum obtained through the process until the sound-source-specific audio signal of a voice section determination target is acquired from the audio signal of a plurality of channels is utilized in a determination of the voice section. Accordingly, an excessive increase in system scale is avoided.

Further, the sound source localization unit 101 calculates the spatial spectrum using the multiple signal classification method or the beam forming method.

With this configuration, the first-section detection unit 102 can use the power of the spectrum calculated using the multiple signal classification method or the beam forming method to detect the first section. Accordingly, an excessive increase in system scale is avoided.

Second Embodiment

Next, a second embodiment of the present invention will be described. In the following description, the same components as those in the first embodiment are denoted with the same reference signs, and a description thereof will be incorporated.

Figure 8:
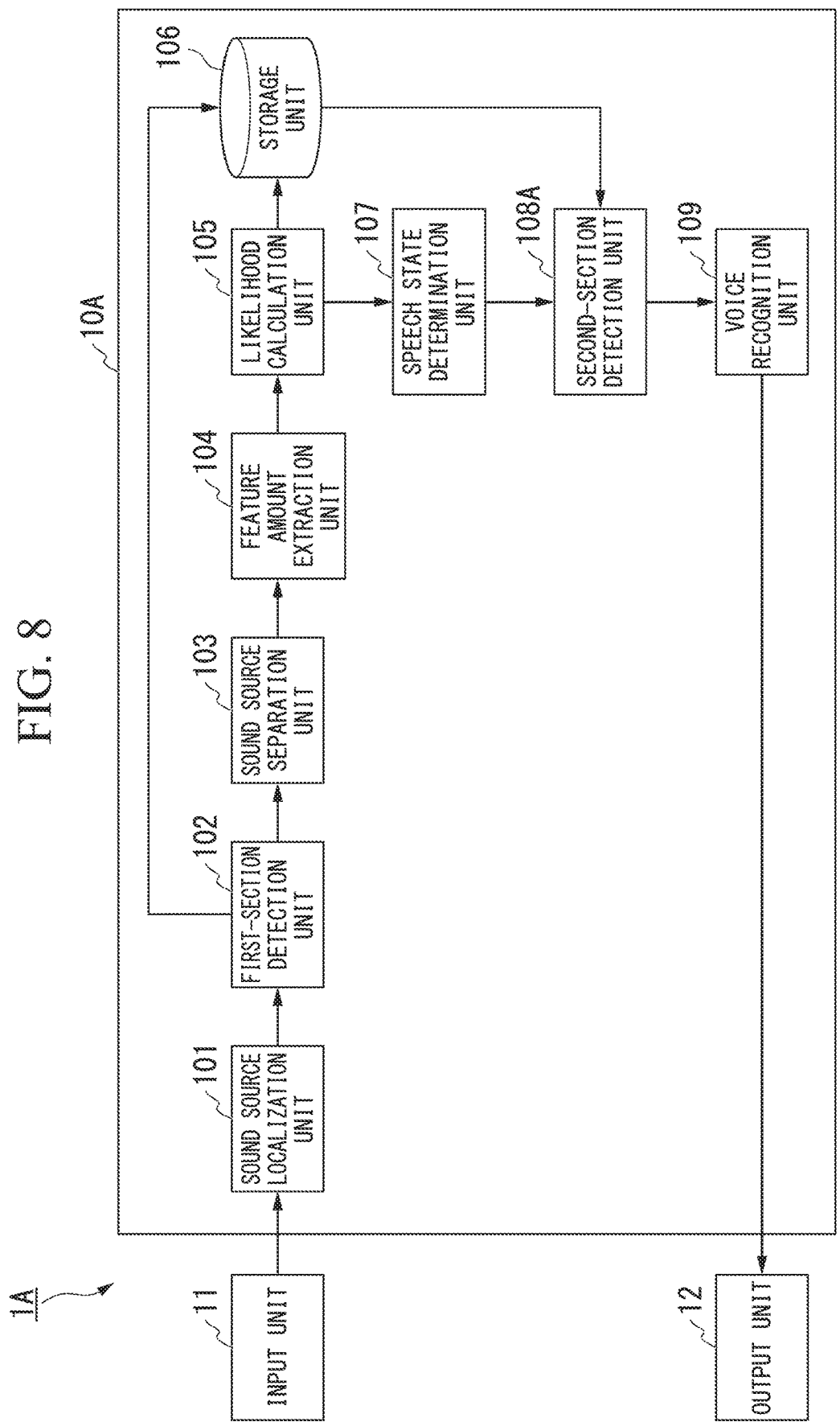
FIG. 8 is a block diagram illustrating a configuration of an audio processing system according to a second embodiment.

FIG. 8 is a block diagram illustrating a configuration of an audio processing system 1A according to this embodiment.

The audio processing system 1A includes an audio processing apparatus 10A in place of the audio processing apparatus 10 (FIG. 1) in the audio processing system 1 (FIG. 1). The audio processing apparatus 10A includes a second-section detection unit 108A in place of the second-section detection unit 108 in the audio processing apparatus 10.

The second-section detection unit 108A specifies a frame of which the power is higher than the average power in the speech section as a frame belonging to the second section, similar to the second-section detection unit 108. The second-section detection unit 108A forms a likelihood vector including, as elements, the first likelihood $p(X_k(f)|\lambda_1)$ and the second likelihood $p(X_k(f)|\lambda_2)$ calculated for the specified frame. The second-section detection unit 108A refers to the area data prestored in the storage unit 106 to determine that a frame of which the formed likelihood vector belongs to the voice area is a voice section and determine that a frame of which the likelihood vector belongs to the non-voice area is a non-voice section. The area data is data including a voice area associated with voice in the vector space of the likelihood vector, and a non-voice area associated with non-voice in the vector space. More specifically, the area data indicates an identification boundary between the voice area and the non-voice area. The second-section detection unit 108A determines a frame of which the power is equal to or lower than the average power in the speech section as a non-voice section, similar to the second-section detection unit 108.

(Area Data)

The audio processing apparatus 10A may further include an area data generation unit (not illustrated). The area data generation unit determines an identification boundary between the voice area and another area on the basis of the distribution of the likelihood vectors of the frame that is a voice section and the distribution of the likelihood vectors of a frame that is a non-voice section through prior learning in advance. The area data generation unit stores area data indicating the determined identification boundary in the storage unit 106.

Figure 9:
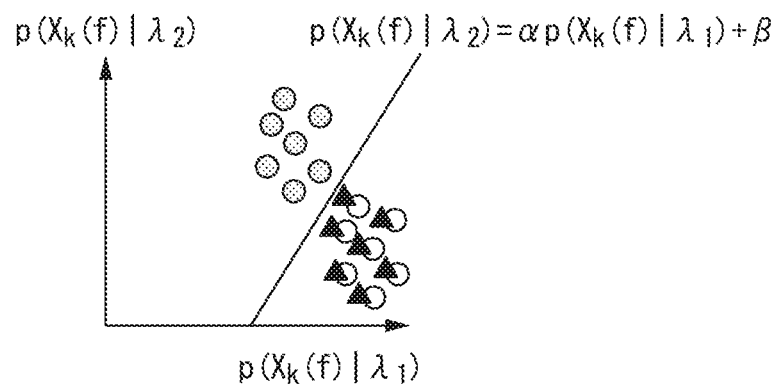
FIG. 9 is a diagram illustrating an example of an identification boundary.

In the following description, a likelihood vector of a frame belonging to the voice section and a likelihood vector of a frame belonging to the non-voice section are referred to as a likelihood vector of a voice class and a likelihood vector of a non-voice class, respectively. In an example illustrated in FIG. 9, the likelihood vector of the voice class and the likelihood vector of the non-voice class are indicated by a "○" symbol and a "▲" symbol, respectively, and the identification boundary is indicated by a straight line. If the identification boundary is the straight line, characteristics thereof are represented by a slope α and an intercept β of the straight line.

For example, logistic regression (LR) or linear discriminant analysis (LDA) is available as a scheme of obtaining the identification boundary from the distribution of the likelihood vector.

LR is a scheme of determining the identification boundary by determining a parameter [w] on the assumption that a posterior probability $p(\lambda_n|\phi(x))$ of each class is a logistic sigmoid function $\sigma([w]^T[\phi(x)])$ of the likelihood vector. Here, $x=p(X_k(f)|\lambda_n)$ (n is 1 or 2). Further, the logistic sigmoid function $\sigma(y)$ is a function represented by Equation (12).

[Equation 12]

$$\sigma(y) = \frac{1}{1+e^{-y}} \quad (12)$$

The logistic sigmoid function $\sigma(y)$ is a function that increases monotonically with an increase in y.

A maximum value and a minimum value of the logistic sigmoid function $\sigma(y)$ are 1 and 0, respectively. When y=0, $\sigma(y)=0.5$. [ϕ(x)] indicates a feature vector [1, $p(X_k(f)|\lambda_1)$, $p(|X_k(f)|\lambda_2)$] including an integer 1, and the first likelihood $p(X_k(f)|\lambda_1)$ and the second likelihood $p(X_k(f)|\lambda_2)$, which are likelihoods of each class, as elements. The parameter [w] indicates a weight vector [w0 w1 w2] including weight coefficients by which respective elements of the feature vector [ϕ(x)] are multiplied as elements. Accordingly, y is calculated by summing a multiplication value obtained by multiplying the likelihood of each class by the weighting factor according to the class and a bias value $w_0$.

That is, the area data generation unit calculates the parameter [w] by performing regression analysis on the logistic sigmoid function $\sigma(y)$ shown in Equation (12) with respect to the distribution of the likelihood vectors obtained for each frame for each class in the LR. In the calculation of the parameter [w], for example, a Newton-Raphson algorithm is available. When the vector space of the likelihood vector includes two areas including the voice area and the non-voice area, the identification boundary between the two areas is given as, for example, a set of likelihood vectors in which $\sigma(y)=0.5$, that is, $[w]^T[\phi(x)]=0$. An equation of the straight line that is the identification boundary is represented by, for example, Equation (13). In an example shown in Equation (13), the slope α is given as $-w_1/w_2$, and the intercept β is given as $-w_0/w_2$.

[Equation 13]

$$p(X_k(f)|\lambda_2) = -\frac{w_1}{w_2}p(X_k(f)|\lambda_1) - \frac{w_0}{w_2} \quad (13)$$

Next, a scheme using LDA will be described. The area data generation unit calculates a discrepancy a first group consisting of likelihood vectors relating to the voice as a type of sound source and a second group consisting of likelihood vectors relating to non-voice as a type of sound source. Further, the area data generation unit calculates a discrepancy within the group between the likelihood vectors in the first group and a discrepancy within the group between the likelihood vectors in the second group. The area data generation unit sequentially updates the parameter [w] for giving the identification boundary to further increase (maximize) a discrepancy between the groups for the identification boundary for dividing the first group and the second group that are temporarily determined and to further decrease (minimize) a discrepancy within the first group and a discrepancy within the second group. For example, a between-group sum of squares is available as an index of a discrepancy between groups. The between-group sum of squares is a sum of pairs of norms including two groups among a plurality of groups. The norm (a square value of a distance) in each pair is a sum of square values (sum of squares) of respective components of a difference vector between a mean value of the likelihood vectors in one group and a mean value of likelihood vectors in the other group. In this embodiment, since the number of groups is 2, the between-group sum of squares is a square value of the average value within the second group from the average value within the first group (a square value of a distance). For example, a within-group sum of squares is available as an index of a discrepancy within the group. The within-group sum of squares is a sum in the group of the norm for the difference vector between each of the likelihood vectors in the group and an average value of the likelihood vectors in the group.

The area data generation unit determines the slope α and the intercept β from the calculated parameter [w].

The area data generation unit generates area data indicating the parameter [w] as an area for applying an identification boundary between the voice area and the non-voice area. The area data generation unit may generate data indicating the bias value $w_0$, the slope α, and the intercept β as the area data.

Figure 10:
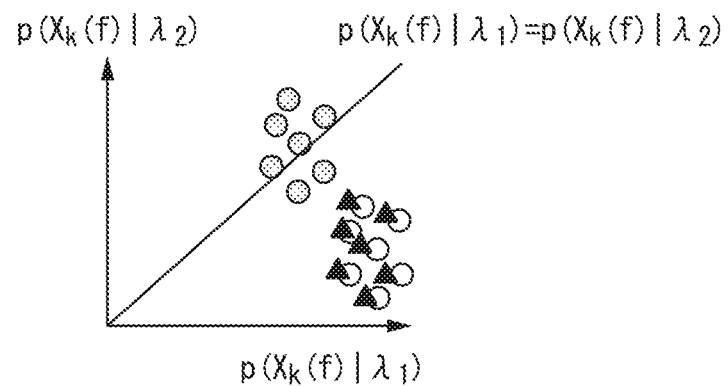
FIG. 10 is a diagram illustrating another example of the identification boundary.

The second-section detection unit 108A is considered to determine a frame in which the first likelihood $p(X_k(f)|\lambda_1)$ is greater than the second likelihood $p(X_k(f)|\lambda_2)$ to be the speech section, and determine other frames to be the non-speech sections (see FIG. 10). However, in the voice section, the first likelihood $p(X_k(f)|\lambda_1)$ is not necessarily greater than the second likelihood $p(X_k(f)|\lambda_2)$. In the non-voice section, the first likelihood $p(X_k(f)|\lambda_1)$ is not always equal to or smaller than the second likelihood $p(X_k(f)|\lambda_2)$. This is because the distribution of the likelihoods calculated on the basis of the voice feature amount is not completely independent and exclusive between the voice and the non-voice.

On the other hand, in this embodiment, the second-section detection unit 108A determines whether a target frame is a voice section or a non-voice section by determining whether the likelihood vector belongs to the voice area or the non-voice area by referring to the area data generated by learning in advance. Therefore, it is possible to identify the voice section and the non-voice section more accurately than with a simple comparison between likelihoods.

The area data generation unit may not necessarily be included in the audio processing apparatus 10A or may be installed outside the audio processing apparatus 10A.

(Evaluation Experiment)

Next, an evaluation experiment performed on the audio processing apparatus 10A according to this embodiment will be described. Conditions of the experiment are the same as those of the evaluation experiment described in the first embodiment. However, in this embodiment, 824 pieces of sound and 990 pieces of non-voice were used as content of the target sound source. Further, the audio processing apparatus 10A was caused to determine whether a type of target sound source was voice or non-voice in each trial. Further, experimental results were accumulated for each of a case in which the area data generated using the LR was used (LR), a case in which the area data generated using the LDA was used (LDA), and a case in which the majority used in the first embodiment was used (majority), in the determination of the sound source for comparison.

(Verification Results)

FIGS. 11, 12 and 13 are tables showing examples of verification results. FIGS. 11, 12 and 13 illustrate the number of times each type of target sound source was determined with respect to the LR, the LDA, and the majority. In FIGS. 11, 12 and 13, each row indicates a type of known target sound source, and each column indicates a type of determined sound source. A second row of FIG. 11 shows that the number of times the type of sound source was determined as voice and the number of times the type of sound source was determined as non-voice were 789 and 35 among a total of 824 when a type of target sound source was voice. A third row of FIG. 11 shows that the number of times the type of sound source was determined as voice and the number of times the type of sound source was determined as non-voice were 23 and 1138 among a total of 1161 when the type of target sound source was non-voice. In comparison with the result of the majority illustrated in FIG. 13, the numbers of times the sound source was correctly determined as voice and non-voice were respectively larger by 2 and 1 in the LR.

In a second row of FIG. 12, in a case in which the type of target sound source was voice, the number of times the type of sound source was determined as voice and the number of times the type of sound source was determined as non-voice were respectively 810 and 14 among a total of 824. In a third row of FIG. 12, in a case in which the type of target sound source was non-voice, the number of times the type of sound source was determined as voice and the number of times the type of sound source was determined as non-voice were respectively 203 and 958 among a total of 1161. In comparison with a result of the majority illustrated in FIG. 13, in the LDA, the number of times the type of sound source was correctly determined as voice was larger by 1, but the number of times the type of sound source was determined as non-voice was reduced by 179 times. The assumption that the voice area and the non-voice area are mutually exclusive when the identification boundary between the voice area and the non-voice area is determined through the generation of the area data is considered as one cause of the above result. As described in a modification example below, since the voice area and the non-voice area are not treated as mutually exclusive areas by further using the other area, it is possible to suppress a degradation of identification accuracy.

(Modification Example)

Next, a modification example of this embodiment will be described. The area data generation unit may generate area data indicating the identification boundary between the voice area and the other area and the identification boundary between the other area and the non-voice area. The area data generation unit may determine a parameter [w] for giving a predetermined real number (for example, 0.6) in which σ(y) is greater than 0.5 and smaller than 1 in a scheme using LR, as the identification boundary between the voice area and the other area. The area data generation unit calculates a between-group sum of squares of the likelihood vector according to the voice included in the voice area divided by a temporarily determined identification boundary and the likelihood vector according to the other sound source included in the other area. The area data generation unit calculates a within-group sum of squares of each of the likelihood vector according to the voice included in the voice area and the likelihood vector according to the other sound source included in the other area in a scheme using LDA as the relevant identification boundary. The area data generation unit performs a process of searching for a parameter [w] for further increasing the between-group sum of squares and further decreasing the within-group sum of squares for a given likelihood vector.

The area data generation unit may determine a parameter [w] for giving a real number in which σ(y) is smaller than 0.5 and greater than 0 (for example, 0.4) in a scheme using LR, as the identification boundary of the other area and the non-voice area. The area data generation unit calculates a between-group sum of squares of the likelihood vector according to the other sound source included in the other area and the likelihood vector according to the non-voice included in the non-voice area in a scheme using LDA as the identification boundary. The area data generation unit calculates a within-group sum of squares of each of the likelihood vector according to the other sound source included in the other area and the likelihood vector according to the non-voice included in the non-voice area. The area data generation unit performs a process of searching for a parameter [w] for further increasing the between-group sum of squares and further decreasing the within-group sum of squares on a given likelihood vector. When a degree of change in the parameter [w] in the search is smaller than a predetermined threshold value of the degree of change, the area data generation unit determines that the parameter [w] has converged and ends the search. Thereafter, the area data generating section stores the generated area data in the storage unit 106.

In this modification example, the second-section detection unit 108A determines the likelihood vector formed for each frame belongs to the voice area, the other area, or the non-voice area indicated by the area data stored in the storage unit 106. When the likelihood vector is determined to belong to the voice area, the second-section detection unit 108A determines that the relevant frame belongs to the voice section. When the likelihood vector is determined to belong to the other area, the second-section detection unit 108A determines that the frame belongs to the other section. When the likelihood vector is determined to belong to the non-voice area, the second-section detection unit 108A determines that the frame belongs to the non-voice section.

In this embodiment or the above-described modification example, the index of the degree of a discrepancy among the plurality of likelihood vectors, which is calculated when the identification boundary is obtained using the scheme using LDA, is not limited to the above-described index. The area data calculation unit may use, for example, a sum of absolute differences (SAD) in place of the sum of squares or may use Mahalanobis' generalized distance in place of the distance.

As described above, the likelihood vector for use in the audio processing apparatus 10A according to this embodiment includes the first likelihood that the type of sound source is voice and the second likelihood that the type of sound source is non-voice. The vector space of the likelihood vector includes a voice area in which the type of sound source is voice, and a non-voice area in which the type of sound source is non-voice. The second-section detection unit 108A detects, as the voice section, a section in which the likelihood vector including the first likelihood and the second likelihood of each frame belongs to the voice area from the first section detected by the first-section detection unit 102.

With this configuration, it is possible to identify the voice section and the non-voice section more accurately than a simple comparison between the first likelihood and the second likelihood.

Further, the second-section detection unit 108A detects the voice section on the basis of the identification boundary of the voice area in the vector space of the likelihood vector, and that which is obtained using the distribution of likelihood vectors on the basis of at least the audio signal within the voice section is used as identification boundary.

With this configuration, the second-section detection unit 108A can determine whether or not the likelihood vector belongs to the voice area through a simple process. Accordingly, the amount of calculation and thereby the amount of necessary hardware can be reduced.

Further, the identification boundary is a portion in which a probability that the type of sound source is estimated to be voice on the basis of the distribution of the likelihood vectors based on the audio signal within the voice section in which the type of sound source is voice in the vector space is a predetermined probability.

Thus, the second-section detection unit 108A can use an area in which the probability that the type of sound source is estimated to be voice is higher than the predetermined probability as the voice area to detect the voice section based on the likelihood vector.

Further, the identification boundary may be determined such that a discrepancy between the first group consisting of the likelihood vectors based on the audio signal within the voice section and the second group consisting of the likelihood vectors based on the audio signal within the non-voice section in which the type of sound source is non-voice further increases and each of a discrepancy between the likelihood vectors within the first group and the discrepancy of the likelihood vectors within the second group decreases.

Thus, the identification boundary can divide a vector section into the voice area and the non-voice area such that the likelihood vectors within the first group and the likelihood vectors within the second group coexist as little as possible. Therefore, detection accuracy of the voice section based on the likelihood vector in the second-section detection unit 108A is improved.

Embodiments of the present invention have been described above with reference to the drawings, but specific configurations are not limited to those described above, and various design modifications can be made without departing from the gist of the present invention.

For example, the audio processing apparatus 10 or 10A may further include an output control unit (not illustrated). When the second-section detection unit 108 or 108A detects another section from the speech section, the output control unit outputs output data indicating information for prompting speech again to the output unit 12. The output data may be image data representing the information so that the information can be viewed or may be audio data indicating the information. The information includes, for example, a message such as "Please speak a little more clearly." Therefore, when it cannot be clearly determined whether the speech of the user is voice, speech is prompted again. Therefore, it is possible to reliably acquire the voice data that is a voice recognition process target.

Some units of the audio processing apparatus 10 or 10A in the above-described embodiment, such as the sound source localization unit 101, the first-section detection unit 102, the sound source separation unit 103, the feature amount extraction unit 104, the likelihood calculation unit 105, the speech state determination unit 107, the second-section detection unit 108 or 108A, and the voice recognition unit 109, may be realized by a computer. In this case, the units can be realized by recording a program for realizing a control function thereof on a computer-readable recording medium, loading the program recorded on the recording medium to a computer system, and executing the program. Further, the "computer system" stated herein is a computer system built in the audio processing apparatus 10 or 10A and includes an OS or hardware such as a peripheral device. Further, the "computer-readable recording medium" refers to a flexible disk, a magneto-optical disc, a ROM, a portable medium such as a CD-ROM, or a storage device such as a hard disk built in a computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in combination with a program previously stored in the computer system.

The audio processing apparatus 10 or 10A in the embodiments and the modification example described above may be partially or entirely realized as an integrated circuit such as a large scale integration (LSI). Functional blocks of the audio processing apparatus 10 or 10A may be individually realized as processors or may be partially or entirely integrated and realized as a processor. Further, a scheme of circuit integration may not be limited to the LSI and may be realized by a dedicated circuit or a general-purpose processor. Further, if a circuit integration technology with which the LSI is replaced appears with the advance of semiconductor technology, an integrated circuit according to such a technology may be used.

Although embodiments of the present invention have been described above in detail with reference to the drawings, a specific configuration is not limited to the above-described configuration, and various design modifications or the like can be made within the scope not departing from the gist of the present invention.

What is claimed is:

1. An audio processing apparatus comprising:
a computer implemented processor, which includes:
a sound source localization unit configured to calculate a spatial spectrum on the basis of an audio signal of a plurality of channels and determine a sound source direction on the basis of the spatial spectrum;
a first-section detection unit configured to detect a first section that is a section in which a power of the spatial spectrum in the sound source direction is higher than a predetermined amount of power on the basis of the audio signal of the plurality of channels;
a sound source separation unit configured to separate an audio signal of each sound source on the basis of transfer characteristics from the sound source direction, from the audio signal of the plurality of channels within the first section;
a feature amount extraction unit configured to calculate a predetermined type of voice feature amount for each frame for the audio signal of each audio source;
a likelihood calculation unit configured to calculate a first likelihood that a type of sound source according to an audio signal within the first section is voice and a second likelihood that the type of sound source is non-voice;
a speech state determination unit configured to determine whether or not the frame is a speech section, in which a speech state in the frame is speech, on the basis of the audio signal within the first section;
a second-section detection unit configured to determine whether or not a second section, in which power is higher than an average power of the speech section to which the first section belongs, is a voice section on the basis of the first likelihood and the second likelihood within the second section; and a voice recognition unit configured to perform a voice recognition process on the voice feature amount of the second section determined to be the voice section,
wherein the voice section is a section in which the type of the sound source is voice associated with a specific phoneme,
wherein a vector space of a likelihood vector including the first likelihood and the second likelihood includes a voice area in which a type of sound source is voice and a non-voice area in which the type of sound source is a non-voice, and the second-section detection unit detects a section in which the likelihood vector including the first likelihood and the second likelihood for each frame belongs to the voice area, as a voice section, from the first section, and
wherein the second-section detection unit detects the voice section on the basis of an identification boundary of the voice area in the vector space, and the identification boundary is determined using at least a distribution of likelihood vectors based on an audio signal within the voice section.

2. The audio processing apparatus according to claim 1, wherein the identification boundary is a portion in which a probability that a type of sound source is estimated to be voice on the basis of a distribution of the likelihood vectors based on an audio signal within a voice section in which a type of sound source is voice in the vector space is a predetermined probability, the identification boundary being determined by a logistic regression and a Newton-Raphson algorithm.

3. The audio processing apparatus according to claim 1, wherein the identification boundary is determined by a linear discriminant analysis such that a between-group discrepancy between a first group consisting of the likelihood vectors based on an audio signal within the voice section and a second group consisting of the likelihood vectors based on an audio signal within a non-voice section in which the type of sound source is non-voice further increases and each of a first within-group discrepancy between the likelihood vectors within the first group and a second within-group discrepancy of the likelihood vectors within the second group decreases, the between-group discrepancy being calculated by a between-group sum of squares, and the first within-group discrepancy and the second within-group discrepancy being calculated by a within-group sum of squares.

4. An audio processing method in an audio processing apparatus, the audio processing method comprising:
executing the following, via a computer implemented processor:
a sound source localization step of calculating a spatial spectrum on the basis of an audio signal of a plurality of channels and determine a sound source direction on the basis of the spatial spectrum;
a first-section detection step of detecting a first section that is a section in which a power of the spatial spectrum in the sound source direction is higher than a predetermined amount of power on the basis of the audio signal of the plurality of channels;
a sound source separation step of separating an audio signal of each sound source on the basis of transfer characteristics from the sound source direction, from the audio signal of the plurality of channels within the first section;

a feature amount extraction step of calculating a predetermined type of voice feature amount for each frame for the audio signal of each audio source;

a likelihood calculation step of calculating a first likelihood that a type of sound source according to an audio signal within the first section is voice and a second likelihood that the type of sound source is non-voice;

a speech state determination step of determining whether or not the frame is a speech section, in which a speech state in the frame is speech, on the basis of the audio signal within the first section;

a second-section detection step of determining whether or not a second section, in which power is higher than an average power of the speech section to which the first section belongs, is a voice section on the basis of the first likelihood and the second likelihood within the second section; and a voice recognition step of performing a voice recognition process on the voice feature amount of the second section determined to be the voice section, wherein the voice section is a section in which the type of the sound source is voice associated with a specific phoneme, wherein a vector space of a likelihood vector including the first likelihood and the second likelihood includes a voice area in which a type of sound source is voice and a non-voice area in which the type of sound source is a non-voice, and the second-section detection step includes detecting a section in which the likelihood vector including the first likelihood and the second likelihood for each frame belongs to the voice area, as a voice section, from the first section, and wherein the second-section detection step includes detecting the voice section on the basis of an identification boundary of the voice area in the vector space, and the identification boundary is determined using at least a distribution of likelihood vectors based on an audio signal within the voice section.

5. An audio processing apparatus comprising: a computer implemented processor, which includes:

a sound source localization unit configured to calculate a spatial spectrum on the basis of an audio signal of a plurality of channels and determine a sound source direction on the basis of the spatial spectrum;

a first-section detection unit configured to detect a first section that is a section in which a power of the spatial spectrum in the sound source direction is higher than a predetermined amount of power on the basis of the audio signal of the plurality of channels;

a sound source separation unit configured to separate an audio signal of each sound source on the basis of transfer characteristics from the sound source direction, from the audio signal of the plurality of channels within the first section;

a feature amount extraction unit configured to calculate a predetermined type of voice feature amount for each frame for the audio signal of each audio source;

a likelihood calculation unit configured to calculate a first likelihood that a type of sound source according to an audio signal within the first section is voice and a second likelihood that the type of sound source is non-voice;

a speech state determination unit configured to determine whether or not the frame is a speech section, in which a speech state in the frame is speech, on the basis of the audio signal within the first section;

a second-section detection unit configured to determine whether or not a second section, in which power is higher than an average power of the speech section to which the first section belongs, is a voice section by using a cumulative likelihood method on the basis of a first cumulative likelihood relative to the first likelihood and a second cumulative likelihood relative to the second likelihood within the second section; and a voice recognition unit configured to perform a voice recognition process on the voice feature amount of the second section determined to be the voice section, wherein the voice section is a section in which the type of the sound source is voice associated with a specific phoneme.

* * * * *